(12) United States Patent
Liu et al.

(10) Patent No.: US 8,421,760 B2
(45) Date of Patent: Apr. 16, 2013

(54) TOUCH PANEL DISPLAY

(75) Inventors: Po-Yuan Liu, Hsinchu (TW);
Hao-Chieh Lee, Taoyuan County (TW);
Chien-Liang Chen, Changhua County (TW); Chun-Ku Kuo, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 493 days.

(21) Appl. No.: 12/539,625

(22) Filed: Aug. 12, 2009

(65) Prior Publication Data

US 2010/0302178 A1 Dec. 2, 2010

(30) Foreign Application Priority Data

May 27, 2009 (TW) .............................. 98117790 A

(51) Int. Cl.
*G06F 3/041* (2006.01)
(52) U.S. Cl.
USPC .......................................... 345/173; 345/204
(58) Field of Classification Search .......... 345/156–184; 178/18.01–20.04
See application file for complete search history.

(56) References Cited

U.S. PATENT DOCUMENTS

| | | | | | |
|---|---|---|---|---|---|
| 4,806,709 | A | * | 2/1989 | Evans ......................... | 178/18.06 |
| 5,179,396 | A | * | 1/1993 | Jeong ............................ | 347/130 |
| 5,247,375 | A | * | 9/1993 | Mochizuki et al. ............. | 349/84 |
| 5,367,390 | A | * | 11/1994 | Scheffer et al. ................ | 349/111 |
| 5,457,289 | A | * | 10/1995 | Huang et al. ................. | 178/18.08 |
| 5,650,597 | A | * | 7/1997 | Redmayne ................. | 178/18.06 |
| 5,798,744 | A | * | 8/1998 | Tanaka et al. .................... | 345/92 |
| 5,929,834 | A | * | 7/1999 | Inoue et al. .................... | 345/104 |
| 6,020,945 | A | * | 2/2000 | Sawai et al. .................... | 349/119 |
| 6,027,958 | A | * | 2/2000 | Vu et al. ......................... | 438/110 |
| 6,305,073 | B1 | * | 10/2001 | Badders, Jr. .................... | 29/622 |
| 6,476,784 | B2 | * | 11/2002 | Zavracky et al. ............... | 345/88 |
| 6,611,299 | B1 | * | 8/2003 | Fujii et al. ....................... | 349/12 |
| 6,661,408 | B2 | * | 12/2003 | Chen ............................. | 345/173 |
| 6,697,139 | B1 | * | 2/2004 | Kawamura et al. ........... | 349/139 |
| 6,819,316 | B2 | * | 11/2004 | Schulz et al. .................. | 345/174 |
| 6,924,869 | B2 | * | 8/2005 | Yu .................................. | 349/152 |
| 7,002,657 | B2 | * | 2/2006 | Hirosue et al. ................ | 349/149 |
| 7,106,308 | B2 | * | 9/2006 | Nakazawa et al. ............ | 345/173 |
| 7,339,579 | B2 | * | 3/2008 | Richter et al. ................. | 345/173 |
| 7,349,054 | B2 | * | 3/2008 | Kohtaka ........................ | 349/150 |
| 7,525,629 | B2 | * | 4/2009 | Konuma et al. ............... | 349/151 |
| 8,116,099 | B2 | * | 2/2012 | Kubota ......................... | 361/803 |
| 2008/0062147 | A1 | | 3/2008 | Hotelling et al. | |
| 2008/0062148 | A1 | * | 3/2008 | Hotelling et al. ............. | 345/174 |
| 2008/0062349 | A1 | * | 3/2008 | Komori .......................... | 349/60 |
| 2008/0129653 | A1 | | 6/2008 | Yamazaki | |
| 2008/0246741 | A1 | | 10/2008 | Hinata | |

* cited by examiner

*Primary Examiner* — Alexander Eisen
*Assistant Examiner* — Sanjiv D Patel
(74) *Attorney, Agent, or Firm* — Jianq Chyun IP Office

(57) ABSTRACT

A touch panel display including a first substrate, a second substrate, a display medium and a touch device is provided. The first substrate has a display area and a peripheral area. The first substrate has a pixel array in the display area and at least one integrated driving circuit in the peripheral area. The integrated driving circuit is electrically connected to the pixel array. The second substrate is disposed above the first substrate to cover the integrated driving circuit and the pixel array. The display medium is disposed on the pixel array and located between the first substrate and the second substrate. The touch device is disposed on the second substrate, and has a sensor element and a wiring element connected to the sensor element. The sensor element is located above the pixel array and the wiring element is located above at least a portion of the integrated driving circuit.

17 Claims, 8 Drawing Sheets

TOUCH PANEL DISPLAY

CROSS-REFERENCE TO RELATED APPLICATION

This application claims the priority benefit of Taiwan application serial no. 98117790, filed on May 27, 2009. The entirety of the above-mentioned patent application is hereby incorporated by reference herein and made a part of specification.

BACKGROUND OF THE INVENTION

1. Field of the Invention

The present invention relates to a display. More particularly, the present invention relates to a touch panel display.

2. Description of Related Art

Recently, with quick development of information and wireless communication technologies and the widespread of various information products, the conventional input devices (for example, a keyboard or a mouse) of many information products have been replaced by touch panels in order to make these information products more convenient, compact, light-weighted, and personalized, wherein the touch panel is combined with a display to form a touch panel display. The touch panels of nowadays are approximately classified into resistive touch panels, capacitive touch panels, optical touch panels, acoustic wave touch panels and electromagnetic touch panels according to a design thereof.

Regarding the resistive touch panel, originally separated conductive layers are contacted and electrically connected due to pressure, so that a voltage drop is generated at the press position. By measuring a position of the voltage drop, coordinates of the press position on the touch panel are determined. Regarding the capacitive touch panel, a uniform electric field is generated at inner and outer conductive layers, so that when a conductor (for example, a user's finger) contacts the touch panel, an electrostatic binding is occurred to generate a tiny capacitance variation. By measuring a position of the capacitance variation, the coordinates of the press position on the panel are determined.

FIG. 1A is a top view of a conventional touch panel display, and FIG. 1B is a cross-sectional view of the touch panel display of FIG. 1A along a line $I_1$-$I_1$'. Referring to FIG. 1A and FIG. 1B, the conventional touch panel display 100 includes a first substrate 110, a second substrate 120, a touch device 130, a liquid crystal layer 140 and a sealant 150.

As shown in FIG. 1B, the sealant 150, the first substrate 110 and the second substrate 120 form a cell, i.e. a closed spacer, to accommodate the liquid crystal layer 140 therein. The first substrate 110 has a display area A and a peripheral area B, wherein a pixel array 112 is located at the display area A, and a gate driving circuit 114 and a source driving circuit 116 are located at the peripheral area B. Moreover, the gate driving circuit 114 is electrically connected to scan lines (not shown), and when the gate driving circuit 114 outputs a scan signal that is sufficient to turn on a thin film transistor (TFT, which is not shown) to the TFT, the TFT is turned on, at the same time, the source driving circuit 116 can input a data signal to a pixel unit (not shown) through a data line (not shown).

The second substrate 120 and the first substrate 110 are respectively located at two sides of the liquid crystal layer 140, and the touch device 130 is disposed on the second substrate 120. Moreover, the touch device 130 includes a sensor element 132, a wiring element 134 and a connecting terminal 136, wherein the wiring element 134 is electrically connected to the connecting terminal 136. In detail, the sensor element 132 includes a plurality of sensor units 132a, and the wiring element 134 includes a plurality of X bus-lines 134a electrically connected to the sensor units 132a, and a plurality of Y bus-lines 134b electrically connected to the sensor units 132a. Therefore, when the user touches the touch device 130, the X bus-lines 134a and the Y bus-lines 134b can transmit the sensing signal to a controller (not shown) through the connecting terminal 136, so as to calculate an X-coordinate and a Y-coordinate of the touch position.

However, in order to cater to a relatively large display area and design requirements of light and slim, and a narrow border, the space of the conventional touch panel display 100 that is used for the wiring element 134 layout is limited. Therefore, the resistance of the wiring element 134 is increased due to an inadequate line width $d_1$, which may lead to delay and distortion for transmitting the sensing signal, and accordingly influences the operation sensitivity of the conventional touch device 130. Moreover, the units number of the sensor element 132 and the lines number of wiring element 134 are also limited, so that the touch resolution of the touch device 130 is confined. In addition, the connecting terminal 136 is preferably disposed at a side opposite to the gate driving circuit 114 and the source driving circuit 116, so as to avoid influencing a follow-up bonding process of the other electronic components and to meet mechanical design requirements. Obviously, a design flexibility of a position of the connecting terminal 136 of the touch device 130 in the conventional touch panel display 100 is not enough.

SUMMARY OF THE INVENTION

The present invention is directed to a touch panel display, in which a substrate used for configuring a touch device extends to cover at least a portion of an integrated driving circuit, so as to increase a layout space of a wiring element used for transmitting a sensing signal.

The present invention provides a touch panel display including a first substrate, a second substrate, a display medium and a touch device. The first substrate has a display area and a peripheral area. The first substrate has a pixel array in the display area and at least one integrated driving circuit in the peripheral area, wherein the integrated driving circuit is electrically connected to the pixel array. The second substrate is disposed above the first substrate to cover the integrated driving circuit and the pixel array. The display medium is disposed on the pixel array and is located between the first substrate and the second substrate. The touch device is disposed on the second substrate, and has a sensor element and a wiring element connected to the sensor element. The sensor element is located above the pixel array and the wiring element is located above at least a portion of the integrated driving circuit.

In an embodiment of the present invention, the first substrate includes a thin film transistor array substrate.

In an embodiment of the present invention, the integrated driving circuit includes at least a gate driver on array (GOA).

In an embodiment of the present invention, the integrated driving circuit includes at least a source driver on array (SOA).

In an embodiment of the present invention, a size of the first substrate is greater than a size of the second substrate.

In an embodiment of the present invention, the integrated driving circuit includes at least a GOA and at least a SOA.

In an embodiment of the present invention, a size of the first substrate is substantially equal to a size of the second substrate.

In an embodiment of the present invention, the second substrate includes a color filter substrate.

In an embodiment of the present invention, the second substrate includes an upper substrate and a common electrode. The common electrode is disposed on the upper substrate, and the touch device and the common electrode are respectively located on two opposite surfaces of the upper substrate.

In an embodiment of the present invention, the second substrate includes a transparent substrate, and the touch device is located on an upper surface or a lower surface of the transparent substrate.

In an embodiment of the present invention, the touch device has a connecting terminal coupled to the wiring element.

In an embodiment of the present invention, the connecting terminal is located at any edge of the second substrate.

In an embodiment of the present invention, the integrated driving circuit is located between the pixel array and the connecting terminal.

In an embodiment of the present invention, a thickness of the integrated driving circuit is between 0.1 um to 100 um.

According to the present invention, since the substrate of the touch panel display that is used for configuring the touch device extends to cover at least a portion of the integrated driving circuit, a layout space of the wiring element is greatly increased. Therefore, restriction of a line width of bus-lines of the wiring element is mitigated, and accordingly a resistance of bus-lines of the wiring element is reduced. Moreover, since quantities of sensor units of the sensor element and lines of the wiring element are increased, a touch resolution of the touch panel display can be increased.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

First Embodiment

Figure 1A:
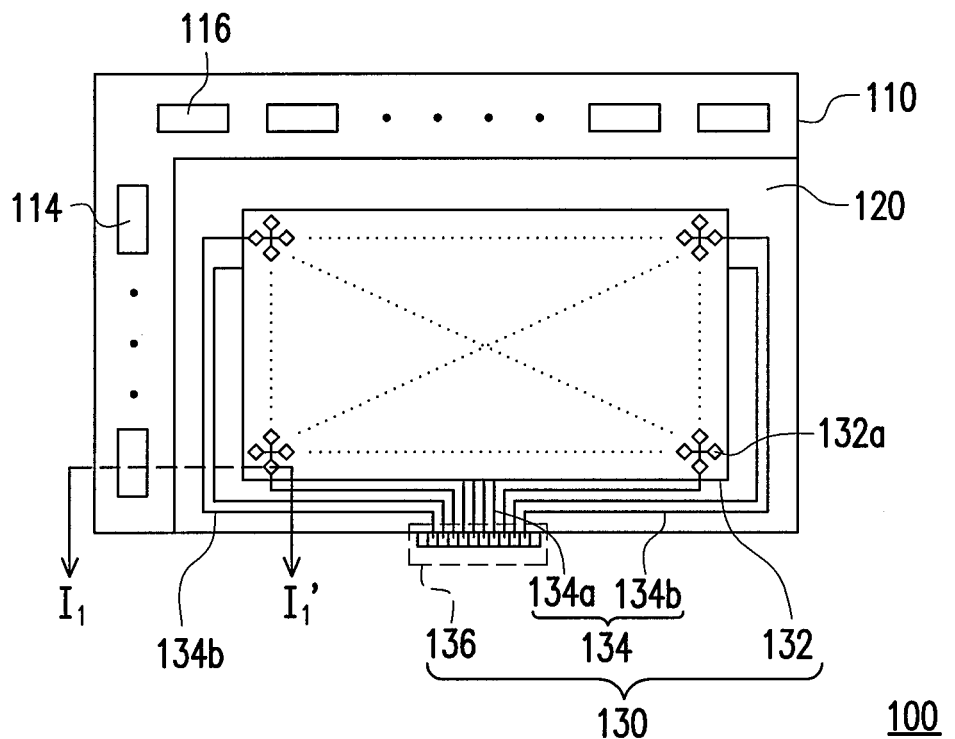
FIG. 1A is a top view of a conventional touch panel display.
Figure 1B:
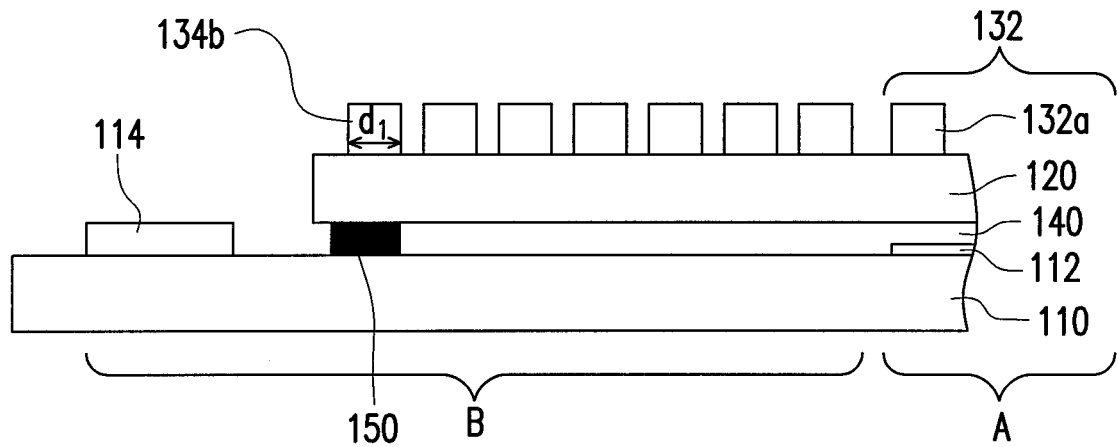
FIG. 1B is a cross-sectional view of a touch panel display of FIG. 1A along a line $I_1$-$I_1'$.
Figure 2A:
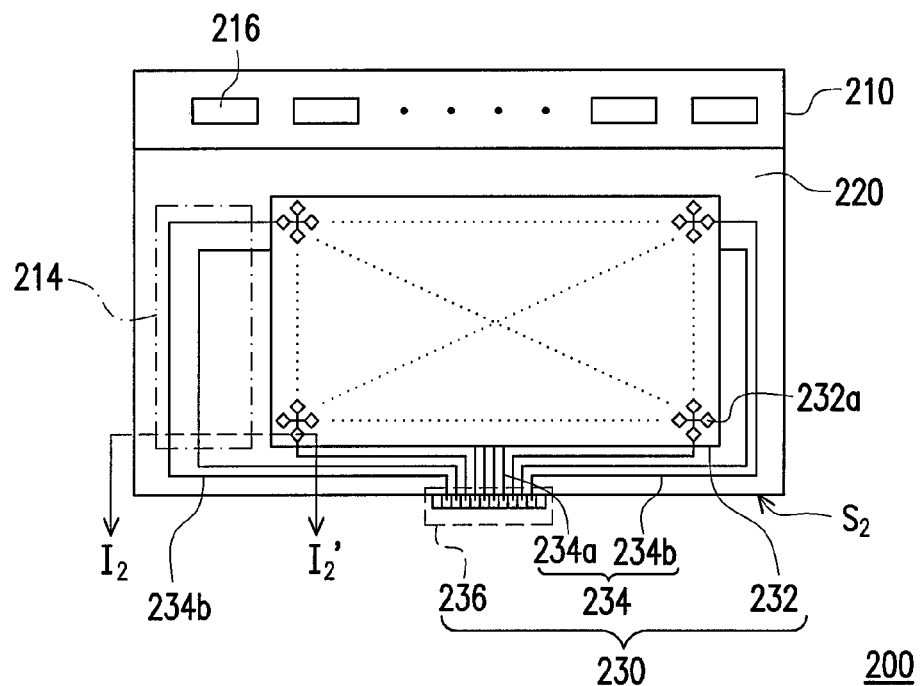
FIG. 2A is a top view of a touch panel display according to a first embodiment of the present invention.
Figure 2B:
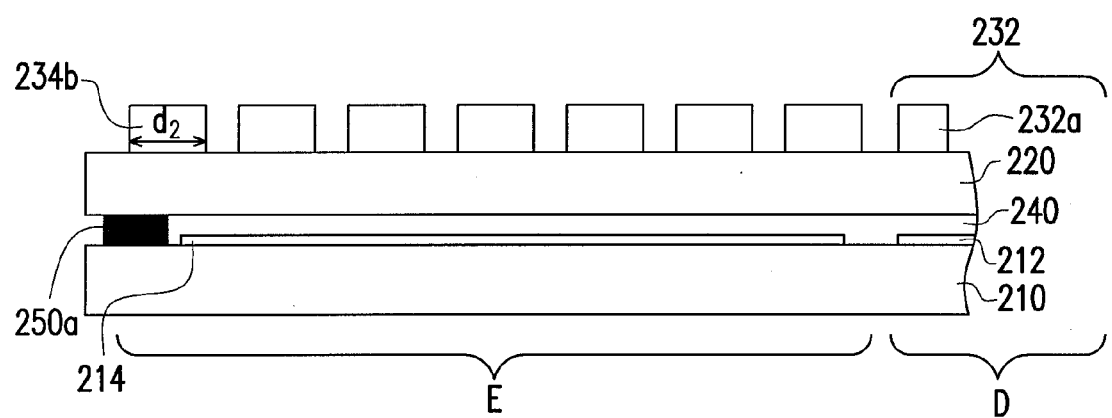
FIG. 2B and FIG. 2C are cross-sectional views of a touch panel display of FIG. 2A along a line $I_2$-$I_2'$.
Figure 2C:
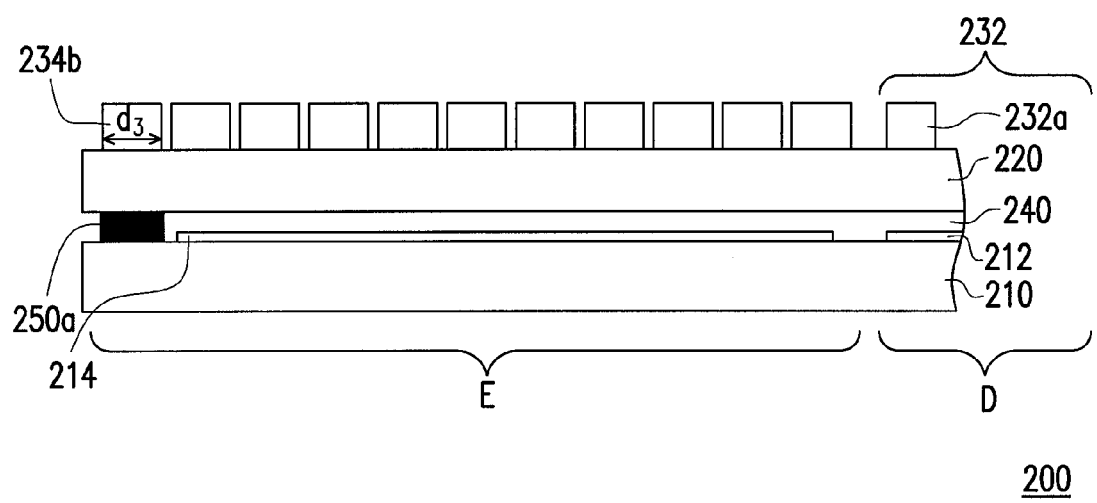

FIG. 2A is a top view of a touch panel display 200 according to the first embodiment of the present invention, and FIG. 2B and FIG. 2C are cross-sectional views of the touch panel display of FIG. 2A along a line $I_2$-$I_2'$. Referring to FIG. 2A and FIG. 2B, the touch panel display 200 of the present embodiment includes a first substrate 210, a second substrate 220, a touch device 230, a display medium 240 and a sealant 250a. A size of the first substrate 210 is greater than that of the second substrate 220. In detail, a width of the second substrate 220 is less than that of the first substrate 210, and a length of the second substrate 220 is substantially the same to that of the first substrate 210. Moreover, the sealant 250a and the two substrates 210 and 220 form a closed space to close the display medium 240 therein. In addition, the display medium 240 includes, for example, a liquid crystal layer, an organic light emitting material layer or an electrophoretic display material layer. The first substrate 210 is, for example, a thin film transistor (TFT) array substrate, which includes a lower substrate, a plurality of scan lines, a plurality of data lines, a plurality of TFTs, a plurality of pixel electrodes, and a peripheral circuit, etc.

As shown in FIG. 2B, the first substrate 210 has a display area D and a peripheral area E, and has a pixel array 212 in the display area D, and at least one integrated driving circuit 214 in the peripheral area E, wherein the integrated driving circuit is located below the second substrate 220, and is electrically connected to the pixel array 212. The pixel array 212 includes a plurality of the scan lines (not shown), a plurality of the data liens (not shown) and a plurality of pixel units (not shown), wherein each of the pixel units is, for example consisted of a TFT, a pixel electrode and a storage capacitor. The TFTs are electrically connected to the scan lines and the data lines, and each of the pixel electrodes is electrically connected to the corresponding TFT.

In the present embodiment, the integrated driving circuit 214 is, for example, a gate driver on array (GOA), which is connected to the scan lines. When the integrated driving circuit 214 outputs a scan signal that is enough to turn on a TFT (not shown) to the TFT, the TFT is turned on. Now, the source driving circuit 216 can input an image signal to the pixel unit through the data line.

As shown in FIG. 2B, the second substrate 220 is disposed above the first substrate 210, and covers at least a portion of the integrated driving circuit 214 and the pixel array 212. Moreover, the second substrate 220 of the present embodiment is, for example, a color filter substrate mainly including a black matrix (not shown) and a plurality of color filters (not shown), wherein the color filters are, for example, color filters of different colors such as red, green and blue, etc.

The display medium 240 is disposed on the pixel array 212, and is located between the first substrate 210 and the second substrate 220. As shown in FIG. 2A and FIG. 2B, the touch device 230 is disposed on the second substrate 220, and includes a sensor element 232 and a wiring element 234. In detail, the sensor element 232 is located above the pixel array 212, and a part of the wiring element 234 is located above the integrated driving circuit 214. Moreover, in the present embodiment, the second substrate 220 further includes an upper substrate and a common electrode, wherein the common electrode is disposed on the black matrix and a surface of the color filters. Moreover, the touch device 230 and the common electrode are respectively located at two opposite sides of the upper substrate.

It should be noticed that in FIG. 2B, though the wiring element 234 is located above the integrated driving circuit 214, in other embodiments, the integrated driving circuit 214 can be not totally covered by the wiring element 234. In other words, the wiring element 234 is only located above a portion of the integrated driving circuit 214. Moreover, a thickness of the integrated driving circuit 214 is between 0.1 um to 100 um.

In addition, the sensor element 232 is electrically connected to the wiring element 234. The sensor element 232 is mainly composed of a plurality of sensing units 232a, and the wiring element 234 includes a plurality of X bus-lines 234a and a plurality of Y bus-lines 234b. As shown in FIG. 2A, the touch device 230 further includes a connecting terminal 236, and the connecting terminal 236 can be located at any edge of the second substrate 220. In the present embodiment, the connecting terminal 236 is located at a long side $S_2$ of the second substrate 220. Therefore, when the user touches the touch device 230, the X bus-lines 234a and the Y bus-lines 234b can transmit the sensing signal to a controller (not shown) through the connecting terminal 236, so as to calculate an X-coordinate and a Y-coordinate of a press position.

It should be noticed that since the integrated driving circuit 214 can be formed integrally with the pixel array 212, and compared with a conventional driving circuit, the integrated driving circuit 214 has a relatively thin thickness, the second substrate 220 can extend outside to cover the integrated driving circuit 214, so as to increase a space of the second substrate that is used for configuring the wiring element 234 (especially the Y bus-lines 234b). Accordingly, when the wiring element 234 has a relatively great configuration space, restriction of a line width (for example, a line width $d_2$ of the Y bus-line 234b) of the wiring element 234 in the configuration space is mitigated. In case that the line width of the wiring element 234 is not greatly restricted, a resistance of the wiring element 234 is reduced, so that a strength of the sensing signal is increased.

Moreover, referring to FIG. 2A to FIG. 2C, FIG. 2C is similar to FIG. 2B, and a difference there between is that a quantity of the wiring element 234 of FIG. 2C is more than a quantity of the wiring element 234 (especially the Y bus-lines 234b) of FIG. 2B. In detail, in the touch panel display 200 of FIG. 2C, a touch resolution of the touch device 230 is increased as the quantity of the Y bus-lines 234b is increased. Therefore, to configure more Y bus-lines 234b in the same configuration space, a line width $d_3$ of the Y bus-line 234b of FIG. 2C is smaller than the line width $d_2$ of the Y bus-line 234b of FIG. 2A. A reduction degree of the line width $d_2$ is determined according to a requirement of the touch resolution. However, it should be noticed that compared to the conventional wiring element 134, since the wiring element 234 of FIG. 2C is relatively wider (i.e. $d_1 < d_3$), the wiring element 234 still has relatively low resistance compared with that of the conventional wiring element 134, so that the sensing signal may have relatively great strength. Moreover, since the quantity of the wiring element 234 is increased, the touch panel display 200 of the present embodiment has higher touch resolution compared with that of the conventional touch panel display 100.

It should be noticed that in the present embodiment, though the integrated driving circuit 214 is GOA, and the second substrate 220 extends along the horizontal direction to cover at least a portion of the GOA, in the other embodiments, the integrated driving circuit 214 can further be a source driver on array (SOA), and now the second substrate 220 extends along the vertical direction to cover at least a portion of the SOA.

In the following embodiments and drawings, the same or like reference numerals refer to the same or the like elements, so as to simplify the description.

Second Embodiment

Figure 3A:
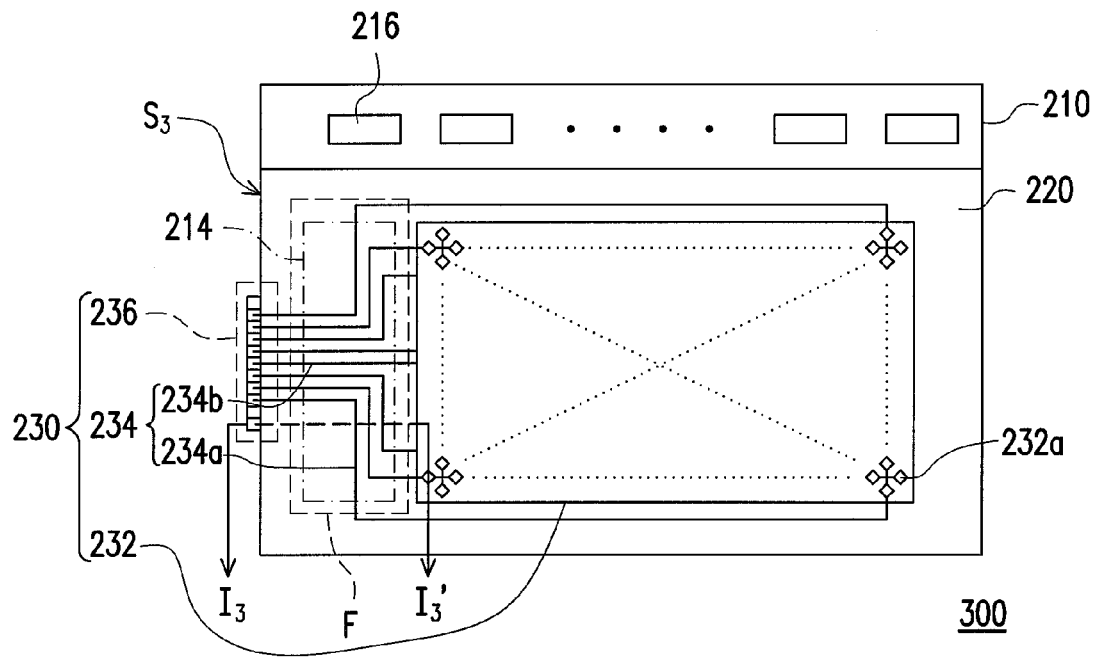
FIG. 3A is a top view of a touch panel display according to a second embodiment of the present invention.
Figure 3B:
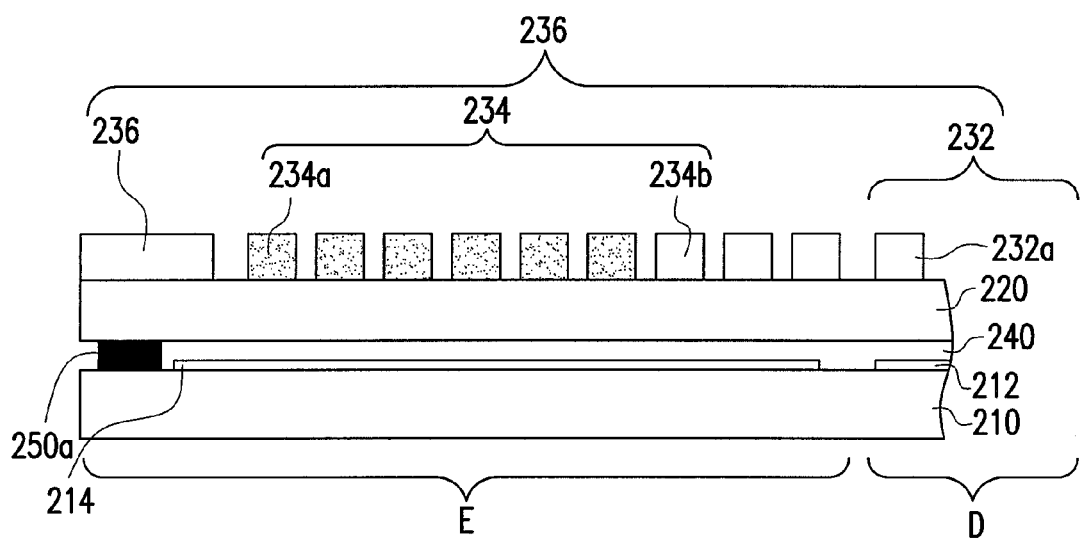
FIG. 3B is a cross-sectional view of a touch panel display of FIG. 3A along a line $I_3$-$I_3'$.

FIG. 3A is a top view of a touch panel display 300 according to the second embodiment of the present invention, and FIG. 3B is a cross-sectional view of the touch panel display of FIG. 3A along a line $I_3$-$I_3$'. Referring to FIG. 3A and FIG. 3B, the touch panel display 300 of the present embodiment is similar to the touch panel display 200 of the first embodiment, and a difference there between is that the connecting terminal 236 of the present embodiment is located at a short side $S_3$ of the second substrate 220. Namely, the wiring element 234 may protrude out pins at the short side $S_3$ of the second substrate 220. In other words, as shown in FIG. 3B, the integrated driving circuit 214 is located between the pixel array 212 and the connecting terminal 236.

In detail, compared to the conventional driving circuit, since a thickness of the integrated driving circuit 214 of the present embodiment is relatively thin, the second substrate 220 can extend outside to cover at least a portion of the integrated driving circuit 214 to increase the space of the second substrate 220 that is used for configuring the wiring element 234, so that the wiring element 234 may have enough space at an area F, and the X bus-lines 234a and the Y bus-lines 234b can all protrude out from the short side $S_3$. Therefore, a position and a quantity of the connecting terminal 236 can be flexibly changed, so that the touch panel display 300 can be flexibly used together with designs of dual-side driving, tri-side driving or quadri-side driving.

Third Embodiment

Figure 4A:
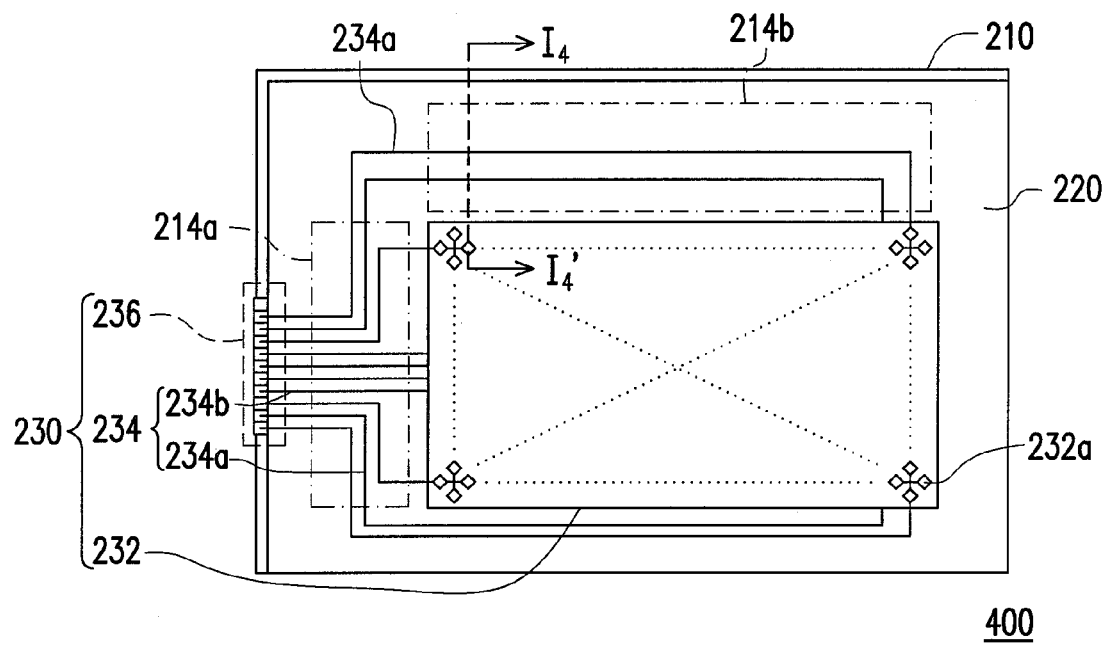
FIG. 4A is a top view of a touch panel display according to a third embodiment of the present invention.
Figure 4B:
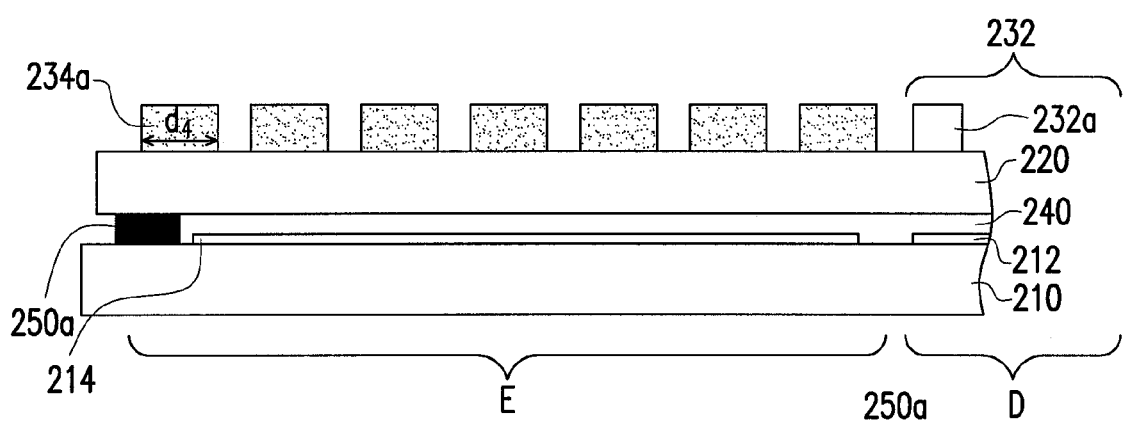
FIG. 4B is a cross-sectional view of a touch panel display of FIG. 4A along a line $I_4$-$I_4'$.

FIG. 4A is a top view of a touch panel display 400 according to the third embodiment of the present invention, and FIG. 4B is a cross-sectional view of the touch panel display of FIG. 4A along a line $I_4$-$I_4$'. Referring to FIG. 4A and FIG. 4B, the touch panel display 400 of the present embodiment is similar to the touch panel display 300 of the second embodiment, and a difference there between is that the integrated driving circuit 214 of the touch panel display 400 of the present embodiment includes at least one GOA 214a and at least one SOA 214b. Therefore, the second substrate 220 can not only extend along the horizontal direction but can also extend along the vertical direction to respectively cover at least a portion of the GOA 214a and at least a portion of the SOA 214b. By such means, the space on the second substrate 220 that is used for configuring the wiring element 234 is larger than that of the first and the second embodiment, so that the quantity of the wiring element 234 can be increased to increase the touch resolution of the touch device 230. Moreover, as shown in FIG. 4B, since the space on the second substrate 220 that is used for configuring the X bus-lines 234a is enlarged, the user can also selectively widen a line width $d_4$ of the X bus-line 234a, so as to reduce the resistance of the X bus-lines 234a to increase the strength of the sensing signal.

It should be noticed that in the present embodiment, though a size of the first substrate 210 is greater than that of the second substrate 220, in other embodiments, the size of the first substrate 210 can also be substantially the same to that of the second substrate 220.

Fourth Embodiment

Figure 5A:
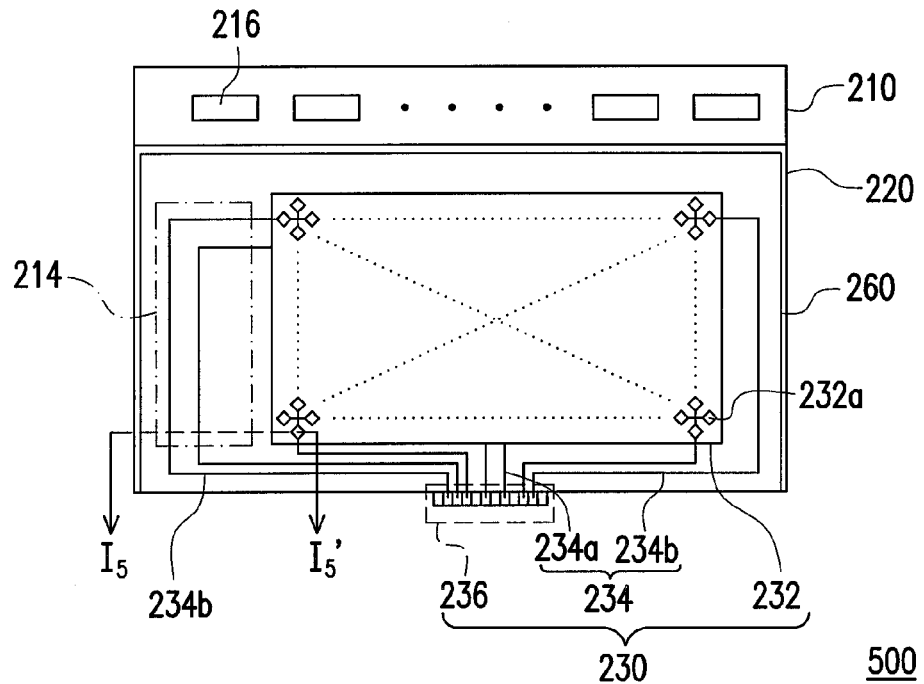
FIG. 5A is a top view of a touch panel display according to a fourth embodiment of the present invention.
Figure 5B:
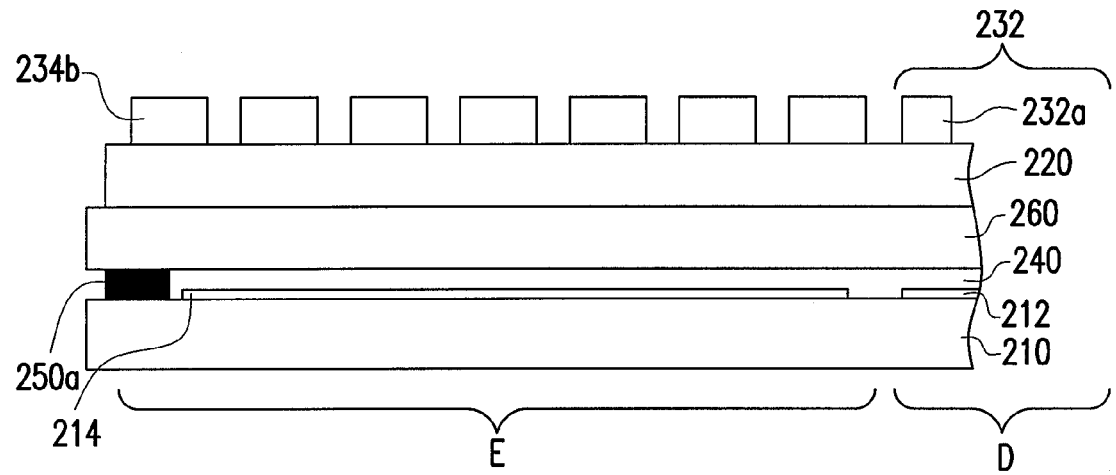
FIG. 5B is a cross-sectional view of a touch panel display of FIG. 5A along a line $I_5$-$I_5'$.

FIG. 5A is a top view of a touch panel display 500 according to the fourth embodiment of the present invention, and FIG. 5B is a cross-sectional view of the touch panel display of FIG. 5A along a line $I_5$-$I_5'$. Referring to FIG. 5A and FIG. 5B, the touch panel display 500 of the present embodiment is similar to the touch panel display 200 of the first embodiment, and a difference there between is that the second substrate 220 is, for example, a transparent substrate, and the touch device 230 (shown in FIG. 5A) is located on an upper surface of the transparent substrate. Moreover, a third substrate 260 of the present embodiment is, for example, a color filter substrate.

As shown in FIG. 5B, in the present embodiment, the second substrate 220 is disposed on the third substrate 260, and the touch device 230 is disposed on the second substrate 220. Namely, the touch panel display 500 of the present embodiment is an out-attached touch panel display, and the touch panel displays 200-400 of the first to the third embodiments are built-in touch panel displays.

Fifth Embodiment

Figure 6A:
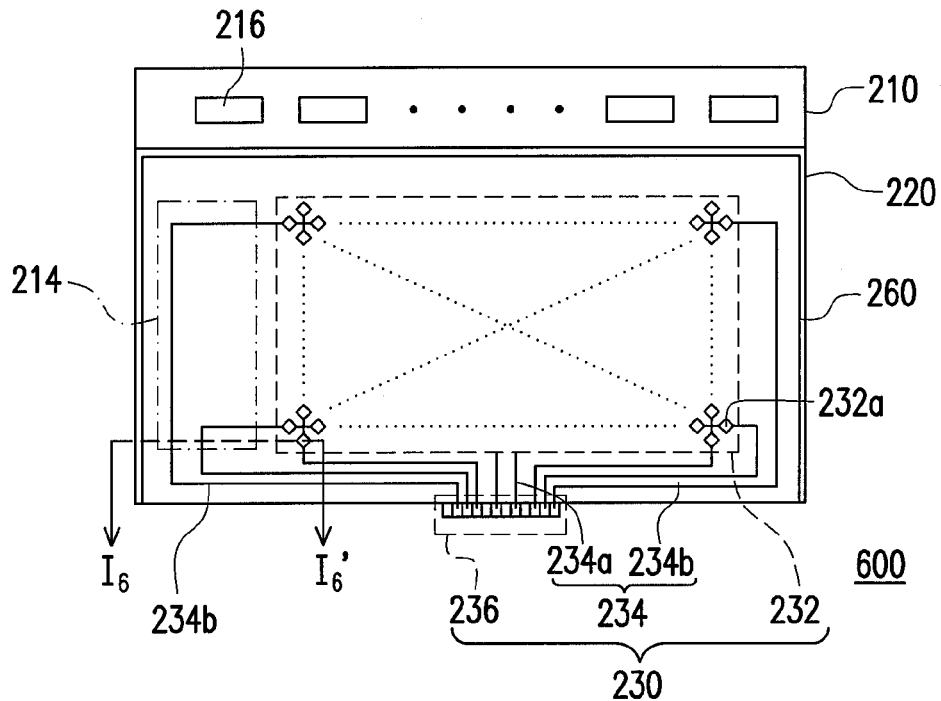
FIG. 6A is a top view of a touch panel display according to a fifth embodiment of the present invention.
Figure 6B:
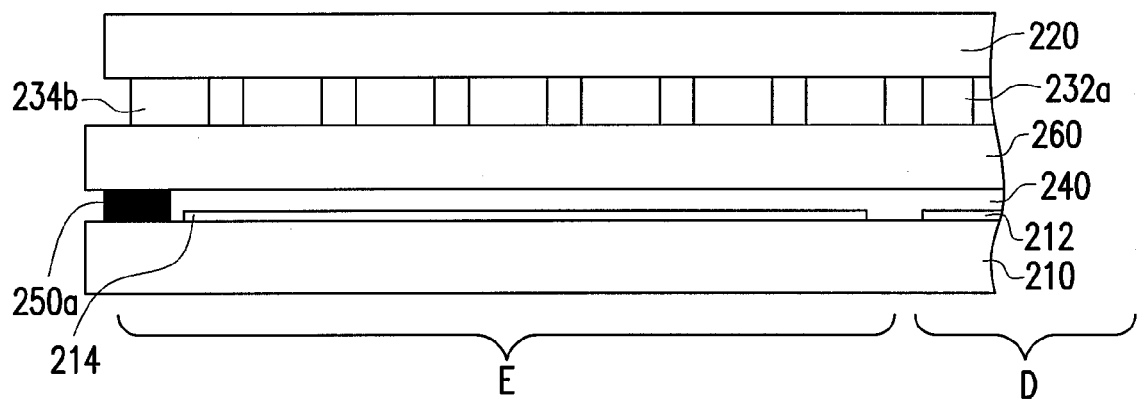
FIG. 6B is a cross-sectional view of a touch panel display of FIG. 6A along a line $I_6$-$I_6'$.

FIG. 6A is a top view of a touch panel display 600 according to the fifth embodiment of the present invention, and FIG. 6B is a cross-sectional view of the touch panel display of FIG. 6A along a line $I_6$-$I_6'$. Referring to FIG. 6A and FIG. 6B, the touch panel display 600 of the present embodiment is similar to the touch panel display 500 of the fourth embodiment, and a difference there between is that the second substrate 220 of the touch panel display 600 of the present embodiment is, for example, a transparent substrate, and the touch device 230 (shown in FIG. 6A) is configured on the second substrate 220, and is located at a lower surface of the transparent substrate. An advantage of such configuration is that the second substrate 220 can serve as a protection cover for the touch device 230.

Sixth Embodiment

Figure 7:
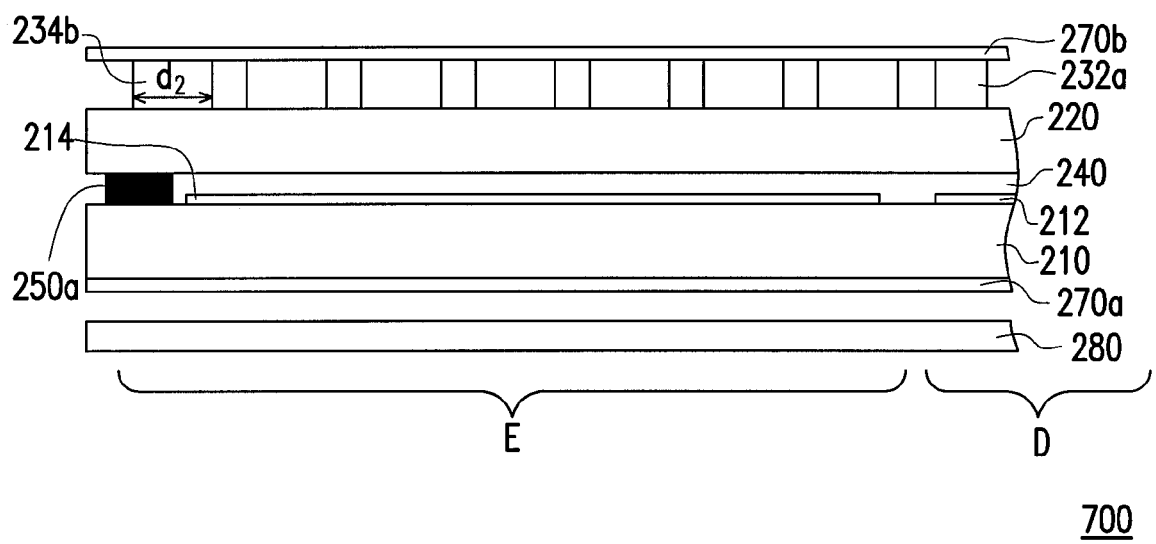
FIG. 7 is a cross-sectional view of a touch panel display according to a sixth embodiment of the present invention.

FIG. 7 is a cross-sectional view of a touch panel display 700 according to the sixth embodiment of the present invention. The touch panel display 700 of the present embodiment is similar to the touch panel display 200 of the first embodiment, and a difference there between is that the display medium 240 of the touch panel display 700 of the present embodiment is a liquid crystal layer, and the touch panel display 700 further includes a backlight module 280.

As shown in FIG. 7, the backlight module 280 is disposed below the first substrate 210 to provide a light source (not shown) to the liquid crystal layer 240. Moreover, the touch panel display 700 further includes polarizers 270a and 270b respectively disposed on the first substrate 210 and the second substrate 220, so as to polarize the light passing there through.

In summary, since the touch panel display of the present invention has at leas one integrated driving circuit, which can be fabricated integrally with the pixel array and has a relatively thin thickness compared to that of the conventional driving circuit, the upper substrate can extend outside to cover the integrated driving circuit, so that a wiring element configuration space of the touch device is increased. When the wiring element layout space of the touch device is increased, the quantities of the units of the sensor element and the lines of the wiring element are increased, so that the touch resolution of the touch panel display is increased. Moreover, restriction of the line width of the wiring element is mitigated, and accordingly a resistance of the wiring element is reduced, and the strength of the sensing signal is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel display comprising:
   a first substrate having a display area and a peripheral area, and the first substrate having a pixel array in the display area;
   a second substrate disposed opposite to the first substrate, the second substrate having a lower surface facing to the first substrate and an upper surface opposite to the lower surface;
   a display medium disposed on the pixel array and located between the first substrate and the second substrate;
   at least one integrated driving circuit disposed in the peripheral area and between the first substrate and the second substrate, the integrated driving circuit being electrically connected to the pixel array; and
   a touch device disposed on the upper surface of the second substrate, the touch device comprising:
   a sensor element located on the upper surface of the second substrate and located in the display area;
   a wiring element electrically connected to the sensor element, the wiring element being located on the upper surface of the second substrate and located in the peripheral area, wherein the wiring element is substantially overlapped with at least a portion of the integrated driving circuit, and the wiring element and the integrated driving circuit are separated from each other; and
   a connecting terminal coupled to the wiring element, the connecting terminal being located on the upper surface of the second substrate and located in the peripheral area for electrically connecting to a controller, wherein the connecting terminal is substantially overlapped with at least a portion of the integrated driving circuit, and the integrated driving circuit is substantially aligned between the pixel array and the connecting terminal.

2. The touch panel display as claimed in claim 1, wherein the first substrate comprises a thin film transistor array substrate.

3. The touch panel display as claimed in claim 1, wherein the integrated driving circuit comprises at least a gate driver on array (GOA).

4. The touch panel display as claimed in claim 3, wherein a size of the first substrate is greater than a size of the second substrate.

5. The touch panel display as claimed in claim 1, wherein the integrated driving circuit comprises at least a source driver on array (SOA).

6. The touch panel display as claimed in claim 5, wherein a size of the first substrate is greater than a size of the second substrate.

7. The touch panel display as claimed in claim 1, wherein the integrated driving circuit comprises at least a gate driver on array (GOA) and at least a source driver on array (SOA).

8. The touch panel display as claimed in claim 7, wherein a size of the first substrate is substantially equal to a size of the second substrate.

9. The touch panel display as claimed in claim 7, wherein a size of the first substrate is greater than a size of the second substrate.

10. The touch panel display as claimed in claim 1, wherein the second substrate comprises a color filter substrate.

11. The touch panel display as claimed in claim 10, wherein the second substrate comprises:
    an upper substrate; and a common electrode disposed on the upper substrate, wherein the touch device and the common electrode are respectively located on the upper surface and the lower surface of the upper substrate.

12. The touch panel display as claimed in claim 1, wherein the second substrate comprises a transparent substrate, wherein the touch device is located on the upper surface of the transparent substrate.

13. The touch panel display as claimed in claim 1, wherein the connecting terminal is located at any edge of the second substrate.

14. The touch panel display as claimed in claim 1, wherein a thickness of the integrated driving circuit is between 0.1 um to 100 um.

15. A touch panel display, comprising:
   a first substrate having a display area and a peripheral area, and the first substrate having a pixel array in the display area;
   a second substrate opposite to the first substrate, the second substrate having a lower surface facing to the first substrate and an upper surface opposite to the first surface;
   a liquid crystal layer disposed on the pixel array and located between the first substrate and the second substrate;
   a backlight module disposed below the first substrate to provide a light source;
   and at least one integrated driving circuit disposed in the peripheral area and between the first substrate and the second substrate, the integrated driving circuit being electrically connected to the pixel array;
   a touch device disposed on the upper surface of the second substrate, the touch device comprising:
   a sensor element located on the upper surface of the second substrate and located in the display;
   a wiring element electrically connected to the sensor element, the wiring element being located on the upper surface of the second substrate and located in the peripheral area, wherein the wiring element is substantially overlapped with at least a portion of the integrated driving circuit, and the wiring element and the integrated driving circuit are separated from each other; and
   a connecting terminal coupled to the wiring element, the connecting terminal being located on the upper surface of the second substrate and located in the peripheral area for electrically connecting to a controller, wherein the connecting terminal is substantially overlapped with at least a portion of the integrated driving circuit, and the integrated driving circuit is substantially aligned between the pixel array and the connecting terminal.

16. The touch panel display as claimed in claim 1, further comprising a third substrate located between the second substrate and the display medium.

17. The touch panel display as claimed in claim 1, wherein the connecting terminal is located at a short side of the second substrate.

* * * * *